United States Patent
Takahashi et al.

(10) Patent No.: US 10,181,095 B2
(45) Date of Patent: Jan. 15, 2019

(54) PREPARATION OPERATION FOR IMAGE FORMING APPARATUS

(71) Applicant: CANON KABUSHIKI KAISHA, Tokyo (JP)

(72) Inventors: Keita Takahashi, Abiko (JP); Shinnosuke Iwadate, Toride (JP); Teruhito Kai, Kashiwa (JP); Hiroto Nishihara, Tsukuba (JP); Hiromi Shimura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/606,259

(22) Filed: May 26, 2017

(65) Prior Publication Data
US 2017/0357882 A1    Dec. 14, 2017

(30) Foreign Application Priority Data

Jun. 10, 2016 (JP) ................. 2016-116457

(51) Int. Cl.
*G06K 15/14* (2006.01)
*G03G 15/01* (2006.01)
*G06K 15/00* (2006.01)
*G06K 15/12* (2006.01)

(52) U.S. Cl.
CPC ......... *G06K 15/14* (2013.01); *G03G 15/0131* (2013.01); *G06K 15/406* (2013.01); *G06K 15/408* (2013.01); *G06K 15/4055* (2013.01); *G06K 15/12* (2013.01)

(58) Field of Classification Search
CPC ............................ G06K 15/14; G03G 15/0131
See application file for complete search history.

(56) References Cited

U.S. PATENT DOCUMENTS

| 8,165,483 | B2 | 4/2012 | Shiori | |
| 8,285,161 | B2* | 10/2012 | Furukawa | G03G 15/0131 399/228 |
| 8,412,060 | B2* | 4/2013 | Watanabe | G03G 15/0131 399/43 |
| 8,537,419 | B2* | 9/2013 | Minamikawa | H04N 1/00002 358/1.9 |

FOREIGN PATENT DOCUMENTS

JP    2009-294643 A    12/2009

OTHER PUBLICATIONS

U.S. Appl. No. 15/620,002, filed Jun. 12, 2017, Hiromi Shimura, Hiroto Nishihara, Keita Takahashi, Shinnosuke Iwadate, Teruhito Kai.

* cited by examiner

*Primary Examiner* — Ibrahim Siddo
(74) *Attorney, Agent, or Firm* — Venable LLP

(57) ABSTRACT

An image forming apparatus performs a first preparation operation in a full color mode when power is supplied. The apparatus performs, when an image formation request is inputted after the first preparation operation completes, a second preparation operation in a designated color mode in accordance with the image formation request. When an image formation request is inputted during the first preparation operation, the apparatus skips the second preparation operation and performs image formation after the first preparation operation completes.

21 Claims, 14 Drawing Sheets

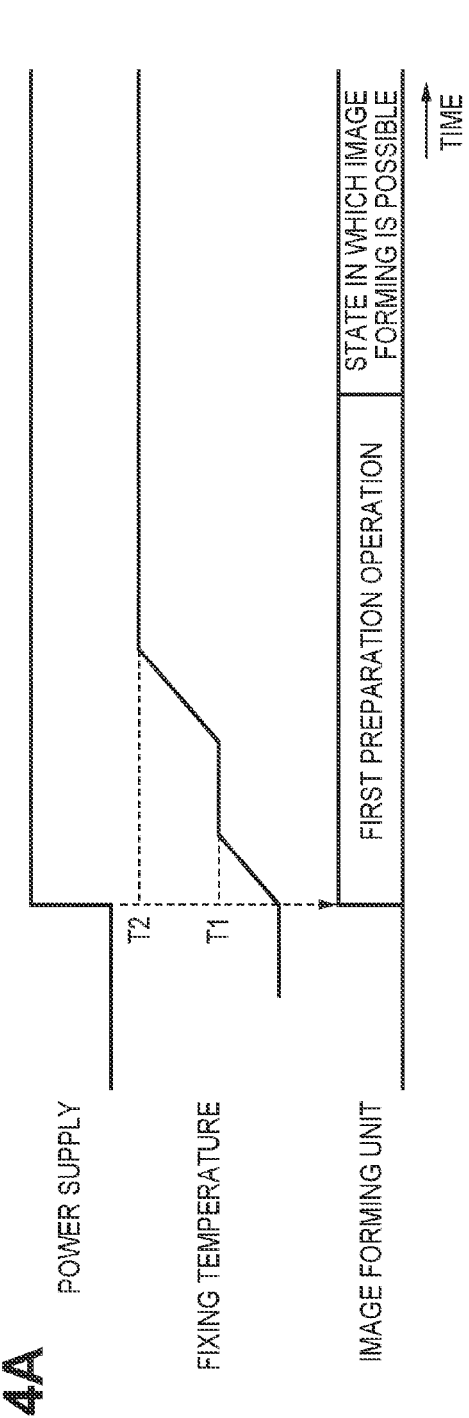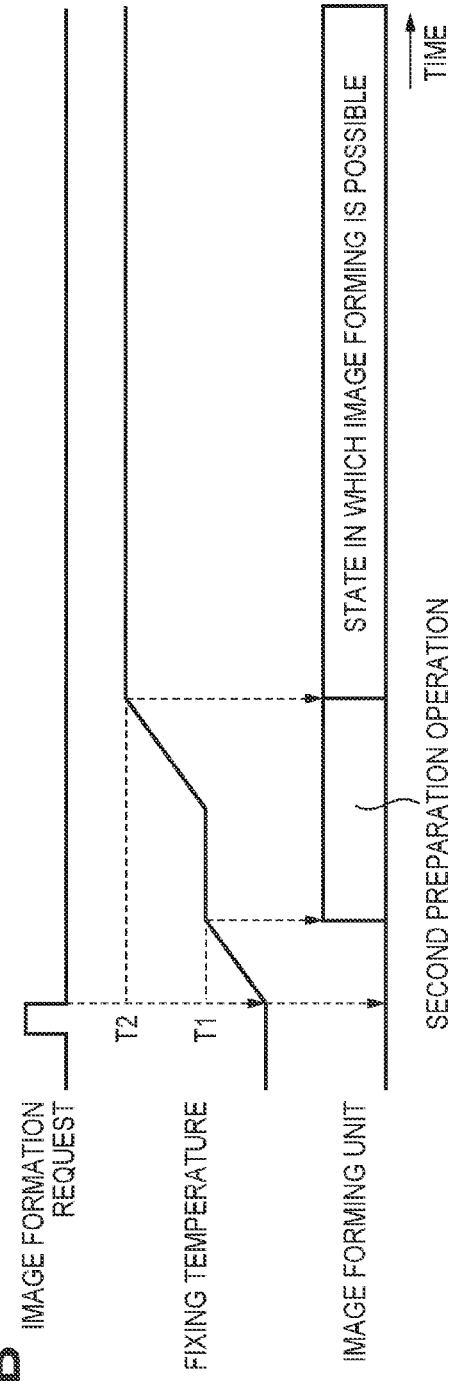

FIG. 5

| | | FIRST PREPARATION OPERATION | SECOND PREPARATION OPERATION |
|---|---|---|---|
| COMMON OPERATIONS | FIXING TEMPERATURE CONTROL | PERFORM | PERFORM |
| | HIGH VOLTAGE OUTPUT | PERFORM | PERFORM |
| IMAGE ADJUSTMENT OPERATIONS | PRIMARY TRANSFER VOLTAGE ADJUSTMENT | PERFORM | — |
| | SECONDARY TRANSFER VOLTAGE ADJUSTMENT | PERFORM | — |
| | MISREGISTRATION CORRECTION | PERFORM | — |
| | IMAGE DENSITY ADJUSTMENT | PERFORM | — |

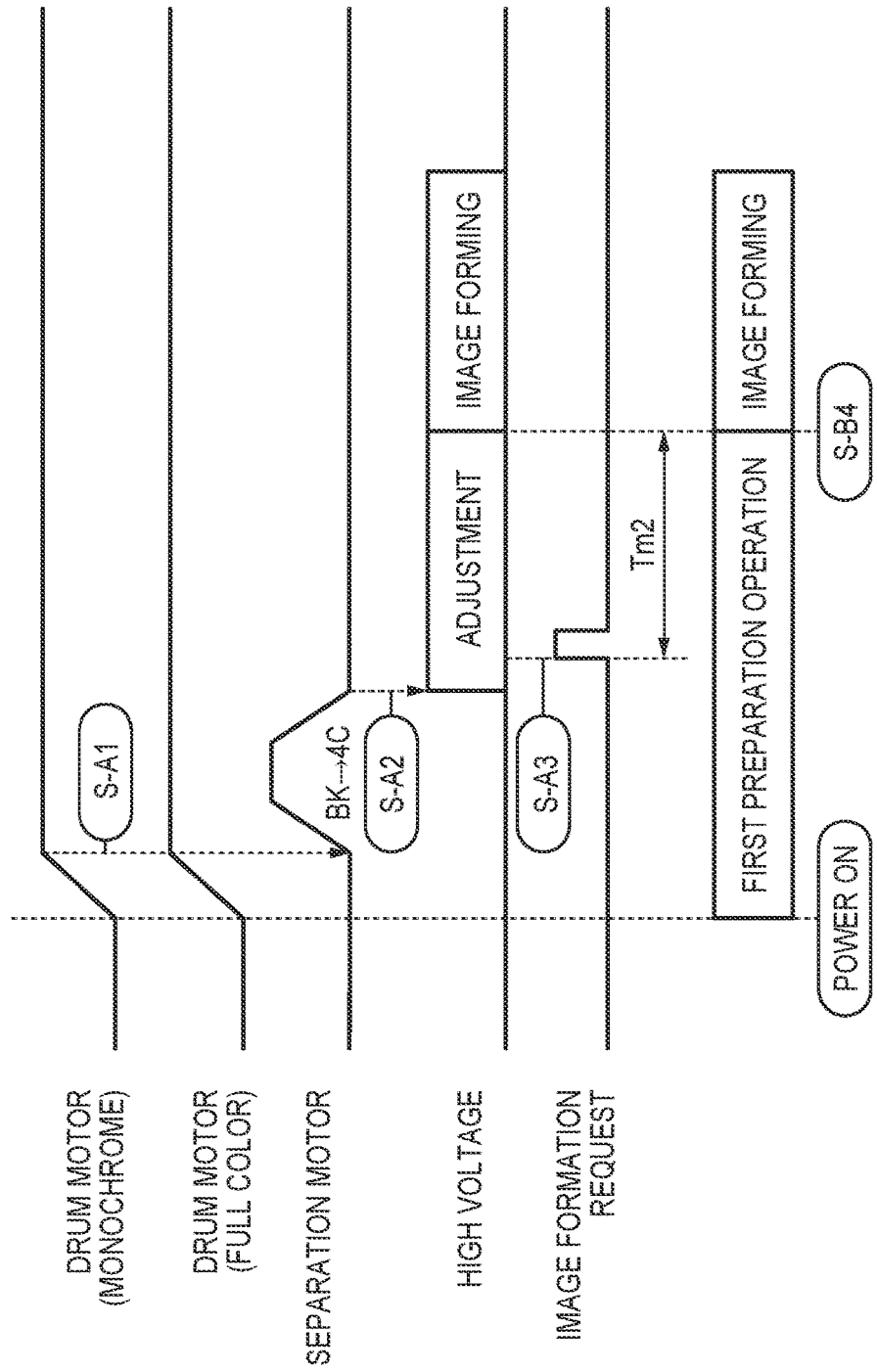

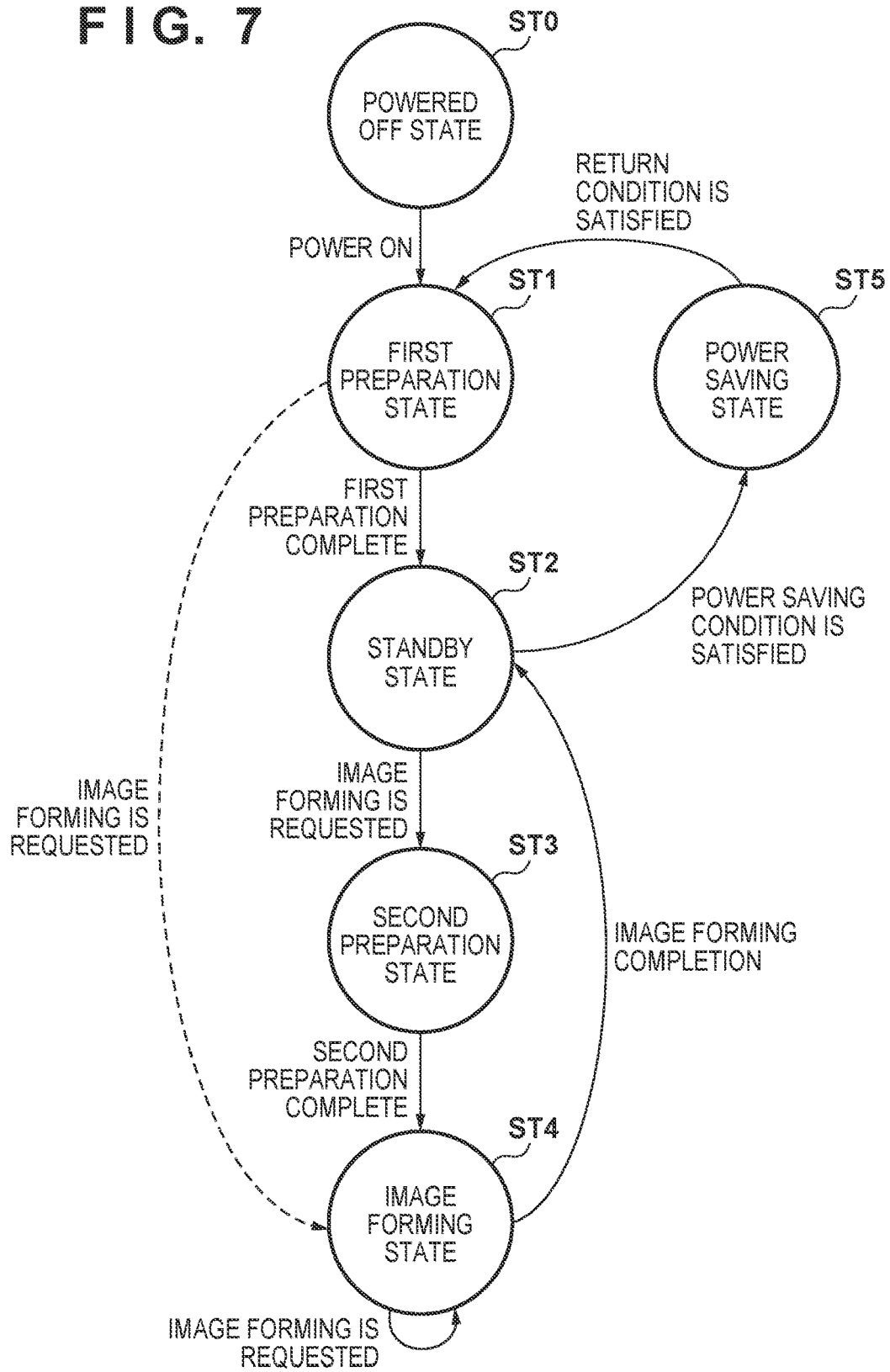

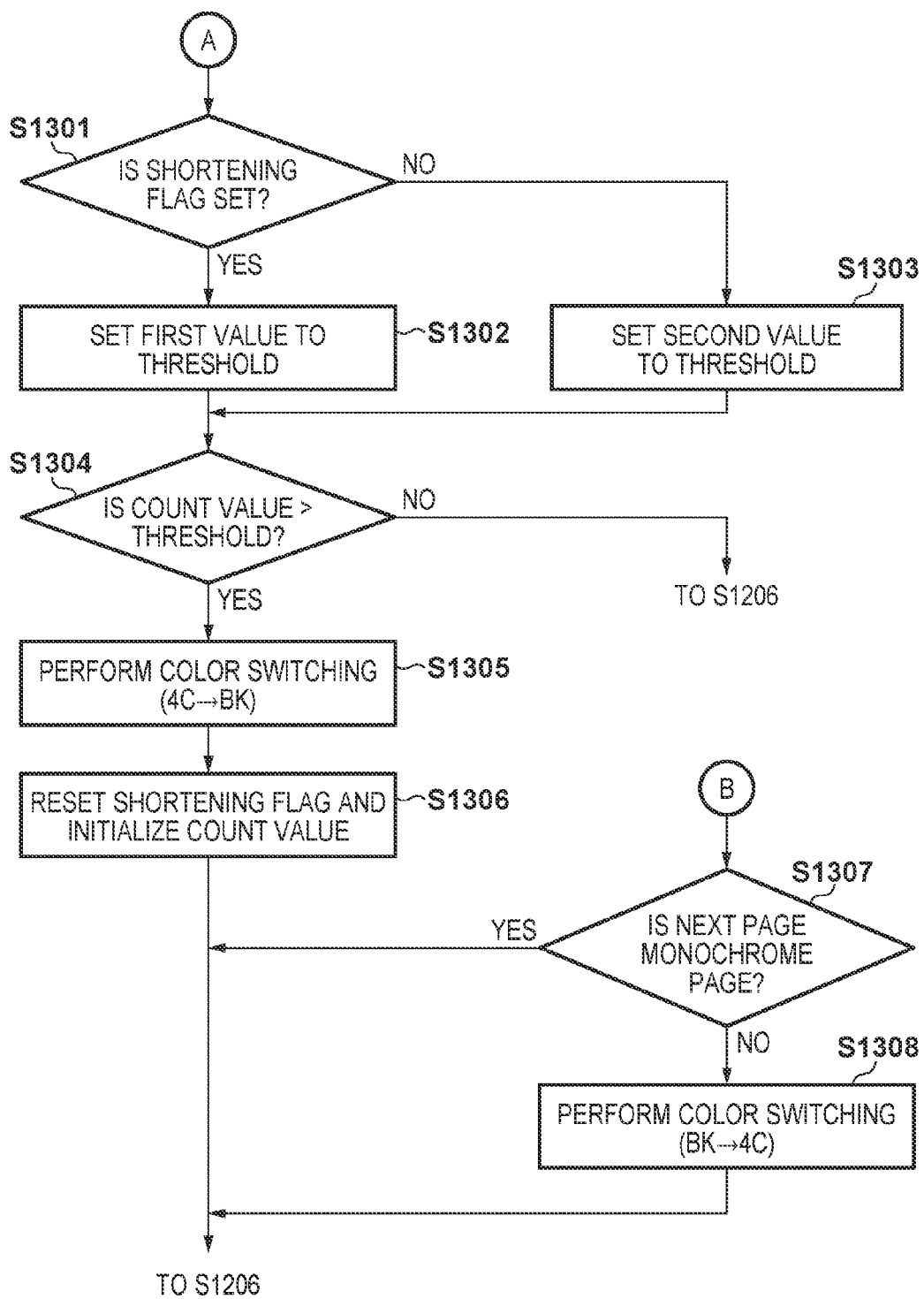

PREPARATION OPERATION FOR IMAGE FORMING APPARATUS

BACKGROUND OF THE INVENTION

Field of the Invention

The present invention relates to a preparation operation for an image forming apparatus.

Description of the Related Art

An image forming apparatus performs a first preparation operation (pre-preparation) when activated due to power being input, when returning from a power saving state, when returning from a jammed state, when a door is opened/closed, or the like. Pre-preparation is an operation that is performed to put the image forming apparatus into a state in which image forming is possible, and various conditions for image forming are adjusted while driving an image forming unit. The image forming apparatus, which has a full color mode for forming a full color image and a monochrome mode for forming a monochrome image, performs pre-preparation in the full color mode. In contrast, when image formation is requested, the image forming apparatus performs a second preparation operation (image formation preparation) for transitioning from a standby state to an image forming state. Image formation preparation is a preparation operation that is simple in comparison to the pre-preparation, and is performed in a color mode corresponding to the image formation request. U.S. Pat. No. 8,165,483 proposes an image forming apparatus that, when a next image formation request occurs during performance of stopping processing after image formation completes, continues to perform image formation preparation without stopping the image forming unit. It is necessary to wait until a stopped photosensitive drum and intermediate transfer body accelerate to a target speed. Accordingly, if these rotating members are kept rotating at the target speed, a waiting time for transitioning to a state in which image forming is possible is shortened.

However, an image formation request may occur during the first preparation operation, and not just during stopping processing. A conventional image forming apparatus transitions to an image forming state after the first preparation operation and the second preparation operation have completed. However, it is also possible that an image forming apparatus can perform image formation if the first preparation operation has completed. Accordingly, the waiting time may be shortened if the second preparation operation is skipped.

SUMMARY OF THE INVENTION

Accordingly, the present invention shortens waiting time when an image formation request occurs during a first preparation operation.

The present invention may provide an image forming apparatus having a full color mode for forming a full color image and a monochrome mode for forming a monochrome image. The apparatus may comprise the following elements. A first forming unit is configured to form a monochrome image in the monochrome mode. A second forming unit is configured to cooperate with the first forming unit to form a full color image in the full color mode. An intermediate transfer unit is configured to contact with the first forming unit and carry the monochrome image in the monochrome mode, and contact with both of the first forming unit and the second forming unit and carry the full color image in the full color mode. A transfer unit is configured to transfer an image carried by the intermediate transfer unit to a sheet. A fixing unit is configured to fix the image to the sheet. A processor is configured to control the image forming apparatus. The processor includes a first preparing function configured to perform a first preparation operation in the full color mode when power is supplied from a power supply to activate the image forming apparatus, and a second preparation function configured to perform, when an image formation request in accordance with either color mode out of the monochrome mode and the full color mode is inputted, a second preparation operation in a color mode in accordance with the image formation request. The processor is configured to, when an image formation request is inputted during performance of the first preparation operation, perform image formation after skipping the second preparation operation when the first preparation operation completes.

Further features of the present invention will become apparent from the following description of exemplary embodiments (with reference to the attached drawings).

BRIEF DESCRIPTION OF THE DRAWINGS

FIGS. 4A and 4B are figures for explaining pre-preparation and image formation preparation.
FIG. 5 is a figure for explaining pre-preparation and image formation preparation.
FIGS. 6A and 6B are figures for explaining normal control and shortening control.
FIG. 7 is a state transition diagram of the image forming apparatus.
FIG. 13 is a flowchart for describing color switching control.

DESCRIPTION OF THE EMBODIMENTS

<Image Forming Apparatus>

Figure 1:
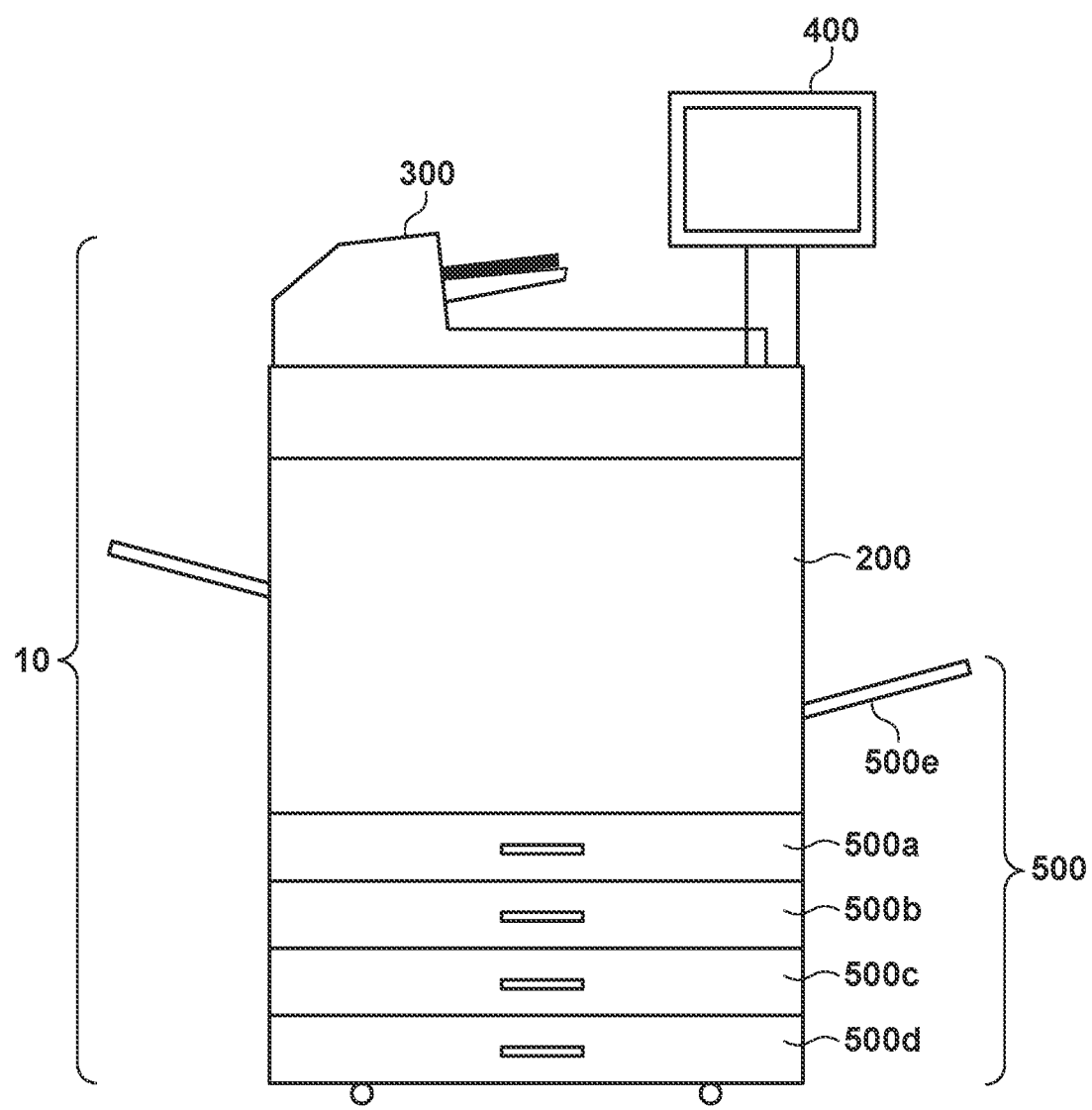
FIG. 1 is a figure illustrating an image forming apparatus.

In FIG. 1, an image forming apparatus 10 comprises an image forming unit 200, a document reader 300, a console unit 400 and a sheet storage apparatus 500. The image forming unit 200 forms an image corresponding to image data transmitted from the document reader 300 or a host computer on a sheet. The document reader 300 reads an original placed on a platen glass or an original conveyed by an auto-feeder, and outputs image data (an image signal) to the image forming unit 200. The console unit 400 comprises an input apparatus for inputting an image formation request and an output apparatus for outputting information to an operator. A color mode (full color or monochrome) is designated through the console unit 400. The sheet storage apparatus 500 comprises a plurality of paper feed cassettes 500a to 500d, a manual feed tray 500e, or the like, and supplies a sheet whose size is designated by an image formation request to the image forming unit 200.

<Image Forming Unit>

Figure 2A:
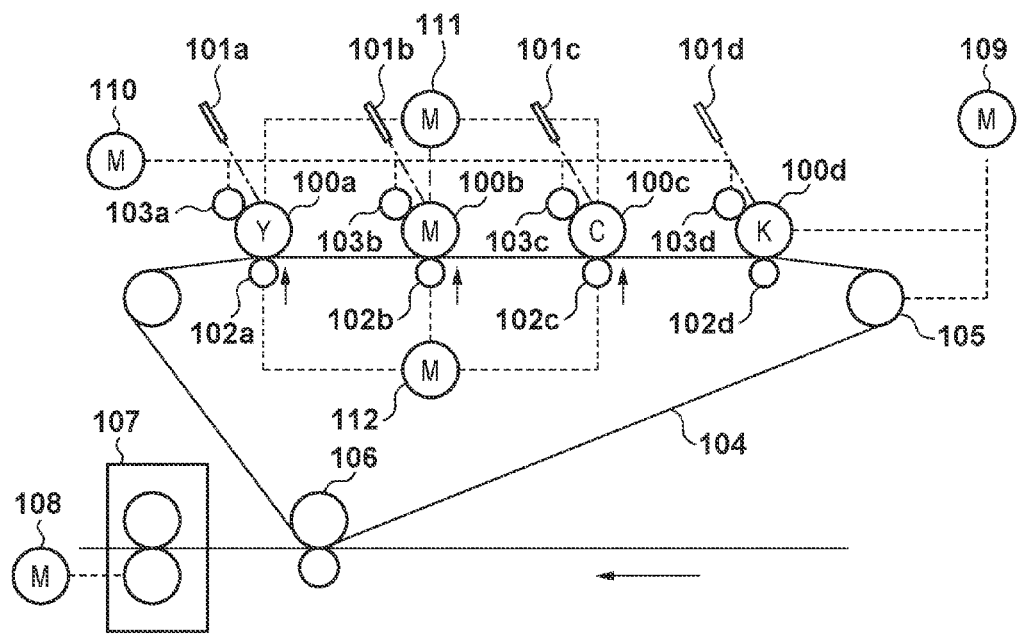
FIGS. 2A and 2B are figures illustrating an image forming unit.
Figure 2B:
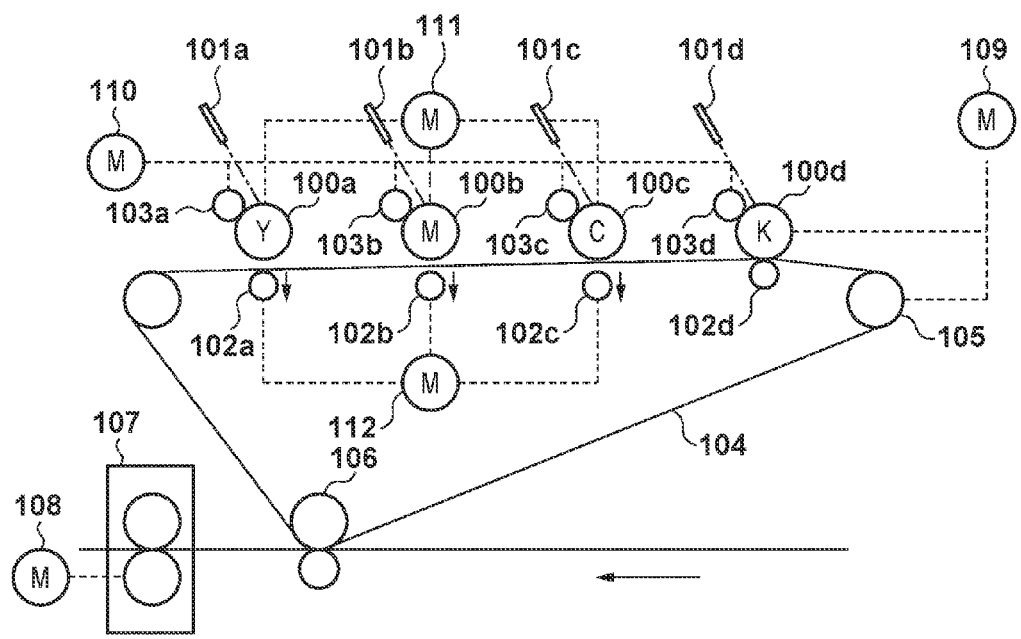

FIG. 2A illustrates the image forming unit 200 in a state of contact (full color mode). FIG. 2B illustrates the image forming unit 200 in a separated state (monochrome mode). In the present embodiment, as one example, toner of four colors is used. In the figure, Y indicates yellow, M indicates magenta, C indicates cyan, and K indicates black. The image forming unit 200 has 4 stations, and each station corresponds to one of YMCK. In FIG. 2A, FIG. 2B, a, b, c and d which are added to the end of a reference numeral indicate Y, M, C and K respectively, but they are omitted when a matter common to the 4 colors is explained.

One station comprises a photosensitive drum 100, a laser scanner 101, a developer 103 and a charger (not shown). The photosensitive drum 100 is an image carrier for carrying an electrostatic latent image and a toner image. A drum motor 109 is a driving source that drives each of a photosensitive drum 100d and a driving roller 105. A drum motor 111 is a driving source that drives photosensitive drums 100a to 100c. A developing motor 110 is a driving source that drives developers 103a to 103d. Transmission of a driving force from the developing motor 110 by a clutch is separately turned ON/OFF for each developer. The laser scanner 101 performs an exposure in accordance with an image signal, and forms an electrostatic latent image on the photosensitive drum 100. The electrostatic latent image formed on the photosensitive drum 100 is developed by the developer 103 using toner, and is converted to a toner image.

An intermediate transfer belt 104 rotates by being driven by the driving roller 105. Primary transfer rollers 102a to 102d transfer each toner image formed on the photosensitive drums 100a to 100d to the intermediate transfer belt 104 in order. The primary transfer rollers 102a to 102d are in contact with an inner circumferential surface side of the photosensitive drums 100a to 100d. As illustrated in FIG. 2A, a separation motor 112 lifts the primary transfer rollers 102a to 102c in the full color mode, and causes the intermediate transfer belt 104 to contact with and separate from the photosensitive drums 100a to 100c. As illustrating FIG. 2B, the separation motor 112 lowers the primary transfer rollers 102a to 102c in the monochrome mode, and causes the intermediate transfer belt 104 to separate from the photosensitive drums 100a to 100c. In this way the separation motor 112 functions as a contact and separating mechanism. In the monochrome mode, by separating the intermediate transfer belt 104 and the photosensitive drums 100a to 100c, wear of the photosensitive drums 100a to 100c is suppressed, and their life span is extended. Note that, not just a full color image but a monochrome image can also be formed in the full color mode. However, the developers 103a to 103c are stopped in such a case because the driving force from the developing motor 110 is not transmitted by the clutch. A developing voltage is not applied to the developers 103a to 103c. Therefore, fogging toners of yellow, magenta and cyan tend not to attach to the respective photosensitive drums 100a to 100c.

A secondary transfer roller 106 transfers the toner image formed on the intermediate transfer belt 104 to a sheet that is supplied from the sheet storage apparatus 500. A fixing device 107 rotates by being driven by a fixing motor 108, adds heat and pressure to the sheet and the toner image, and fixes the toner image to the sheet. The fixing device 107 comprises two rotating members such as a pressure roller and a fixing film. Heat is supplied from a heater to the fixing film.

<Block Diagram>

Figure 3:
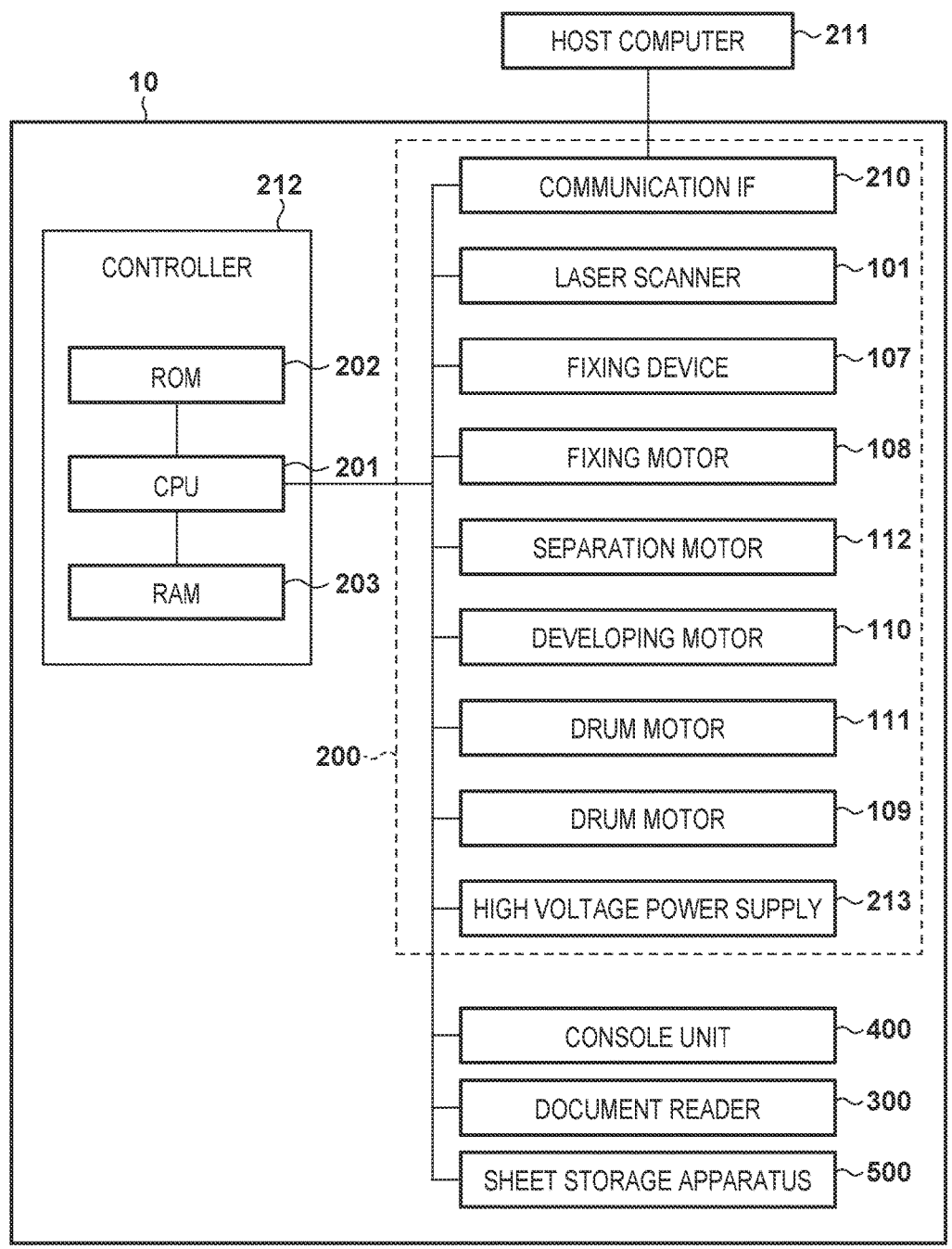
FIG. 3 is a figure illustrating a controller.

FIG. 3 is a figure illustrating a control system of the image forming apparatus 10. A controller 212 that controls each unit of the image forming apparatus 10 has a CPU 201, a ROM 202, and a RAM 203. The CPU 201 is a processor that realizes various functions by executing a control program stored in the ROM 202. In the RAM 203 is stored, for example, data or variables relating to control, such as a flag. The CPU 201 receives a request for image formation from a host computer 211 via the console unit 400 or a communication interface 210, analyzes the request, and causes an image to be formed by the image forming apparatus 10 in accordance with the request. A high voltage power supply 213 is a power supply apparatus that generates high voltages, such as a charge voltage, a developing voltage, a primary transfer voltage, and a secondary transfer voltage, in accordance with an instruction from the CPU 201. The charge voltage is a voltage that is applied to uniformly charge a surface of the photosensitive drum 100. The developing voltage is a voltage applied to, for example, a developing sleeve of the developer 103 to cause toner to fly onto an electrostatic latent image. The primary transfer voltage is a voltage that is applied to a primary transfer roller 102 to transfer a toner image carried on the photosensitive drum 100 to the intermediate transfer belt 104. The secondary transfer voltage is a voltage that is applied to the secondary transfer roller 106 to transfer a toner image carried on the intermediate transfer belt 104 to a sheet.

<First Preparation Operation>

Preparation operations are operations for causing the image forming apparatus 10 to transition to a state in which image forming is possible, and there are a first preparation operation and a second preparation operation. The first preparation operation is an operation for causing the image forming apparatus 10 to transition from a stopped state in which the image forming apparatus 10 is stopped to a state in which image forming is possible. The first preparation operation includes at least image adjustment operations. The second preparation operation is an operation for causing the image forming apparatus 10 to transition from a standby state to a state in which image forming is possible. The second preparation operation does not include the image adjustment operations. Note that the standby state refers to a state (a state in which the four stations are not operating) in which image formation is not being performed, after image formation has ended or after the first preparation operation has ended until an image formation request is inputted.

FIG. 4A and FIG. 5 are views for explaining the first preparation operation. As illustrated in FIG. 4A, when power from an external power supply such as a commercial alternating current power supply is supplied, the CPU 201 performs the control program to activate the image forming apparatus 10. One of these activation processes includes the first preparation operation. As illustrated in FIG. 5, the first preparation operation includes common operations and image adjustment operations. Common operations are operations that are also performed in the second preparation operation. Image adjustment operations include adjustment of the primary transfer voltage, adjustment of the secondary transfer voltage, misregistration correction, adjustment of an image density, or the like. Adjustment of the primary transfer voltage is processing for deciding a current value necessary to obtain (a target voltage of) the primary transfer voltage in accordance with temperature, humidity, an endurance situation of the image forming apparatus 10, or the like. Such adjustment is necessary because the impedance of the primary transfer unit changes in accordance with temperature, humidity, or endurance conditions of the image forming apparatus 10. Adjustment of the secondary transfer voltage is processing for deciding a current value for achieving (a target voltage of) the secondary transfer voltage in accordance with temperature, humidity, an endurance conditions of the image forming apparatus 10, or the like. Misregistration correction is processing for causing formation positions for each image of YMCK to match. An image density adjustment is processing for updating a tone correction table so that a tone characteristic of an input image (an original image) matches a tone characteristic of an output image (a toner image formed on a sheet), or for adjusting a maximum image density. Because each image of YMCK is necessary in misregistration correction, the first preparation operation is performed in the full color mode. The first preparation operation includes cleaning control. Cleaning control is control for cleaning the photosensitive drum 100 or the intermediate transfer belt 104 by applying a high voltage for cleaning to the photosensitive drum 100 or the intermediate transfer belt 104 from a cleaning member such as a blade.

Note that the common operations performed also in the second preparation operation and not just the first preparation operation include adjustment of a fixing temperature, adjustment of output of a high voltage, processing for accelerating the rotation speed of each rotating member to a target speed, or the like. As illustrated in FIG. 4A, the CPU 201 increases the fixing temperature of the fixing device 107 to a first temperature T1, and then increases it to a second temperature T2. In comparison to a period required to accelerate the rotation speed of a rotating member to a target speed, a period required to increase the fixing temperature of the fixing device 107 to the second temperature T2 is longer. Therefore, a waiting time is shortened by preliminarily heating the fixing temperature of the fixing device 107 to the first temperature T1. Note that it may be understood that the first temperature T1 is a temperature for allowing preparation of image formation, and the second temperature T2 is a temperature for allowing image formation itself. When the image adjustment operations complete, the image forming apparatus 10 transitions to a state in which image formation can be performed.

FIG. 4A illustrates that the first preparation operation is performed at a time of activation of the image forming apparatus 10, but it may be performed at another timing. For example, the CPU 201 performs the first preparation operation when a power saving state (a sleep state) is returned from, when a jam is resolved, when a door for accessing inside the image forming apparatus 10 is opened and closed, or the like. When the image forming apparatus 10 stops operation for a long period, an internal environment of the image forming apparatus 10 changes in comparison to an internal environment when the image forming apparatus operated last, and various conditions for image forming cease to be suitable. Therefore, the first preparation operation becomes necessary.

<Second Preparation Operation>

If a period in which the image forming apparatus 10 is not forming an image, such as in a standby state, is short, a change of the internal environment can be ignored. Therefore, the image adjustment operations are unnecessary, and the simpler second preparation operation is performed. The second preparation operation is performed by an image formation request being inputted. FIG. 4B illustrates the second preparation operation. When an image formation request is received in the standby state, the CPU 201 increases the fixing temperature to the first temperature T1. Additionally, the CPU 201 starts the second preparation operation, increases the fixing temperature to the second temperature T2, and also starts output of a high voltage to the high voltage power supply 213. When the second preparation operation completes, the image forming apparatus 10 enters a state in which image formation can be performed.

Note that the CPU 201 analyzes the image formation request, and then determines whether the color mode is the monochrome mode (BK mode) or the full color mode (4C mode). The CPU 201 performs the second preparation operation by the color mode designated by the image formation request. If the monochrome mode is designated, the CPU 201 drives the separation motor 112, separates the photosensitive drums 100a to 100c for YMC from the intermediate transfer belt 104, and supplies a high voltage to only the station responsible for black. If the full color mode is designated, the CPU 201 drives the separation motor 112, causes the photosensitive drums 100a to 100c for YMC to be in contact with the intermediate transfer belt 104, and supplies a high voltage to all of the YMCK stations. Configuration may be taken to start output of high voltages out of the second preparation operation at a timing when the fixing temperature reaches the first temperature T1, as illustrated in FIG. 4B. In other words, adjustment of the fixing temperature may be performed prior to output of the high voltages. In such a case, the first temperature T1 is a threshold temperature for allowing the start of the second preparation operation. Note that the CPU 201 may decide the second temperature T2 in accordance with the type of a sheet (size, thickness, existence or absence of gloss, or the like) designated by the image formation request. As described above, the second preparation operation includes processing for controlling the rotation speed of the photosensitive drum 100 to the target speed. Therefore, by delaying the start of the second preparation operation, a period in which the photosensitive drum 100 rubs the intermediate transfer belt 104 decreases, and the life span of the photosensitive drum 100 should be extended.

<Shortening Control for Waiting Time>

Figure 6A:
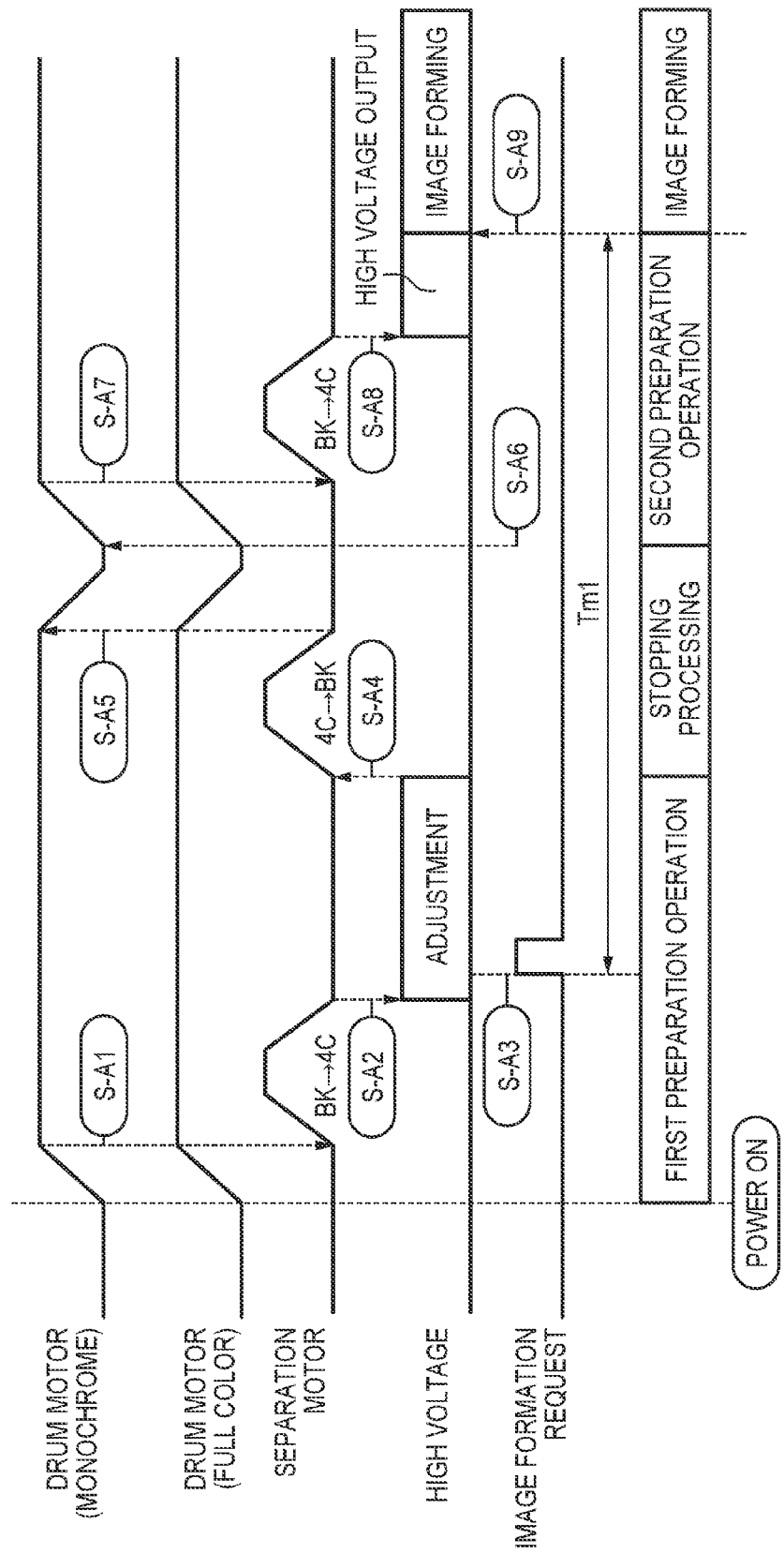

FIG. 6A illustrates state transitions of the image forming unit 200 in a case where shortening control is not employed. FIG. 6B illustrates state transitions of the image forming unit 200 in a case where shortening control is employed. Shortening control refers to omitting stopping processing and the second preparation operation. In both cases here, it is presumed that an image formation request occurs while the first preparation operation (image adjustment operations) is being performed.

Case of No Shortening Control (Comparative Example)

As illustrated in FIG. 6A, when a request for formation of a full color image occurs in a period in which the first preparation operation is being performed, the CPU 201 starts driving of the drum motors 109 and 111, and starts the image adjustment operations. In step S-A1, when the rotation speed of the drum motors 109 and 111 reaches the target speed, the CPU 201 drives the separation motor 112 to have the intermediate transfer belt 104 be in contact with the photosensitive drums 100a to 100c. In step S-A2, when the contact completes, the CPU 201 starts output of a high voltage required by the image adjustment operations. In addition, the CPU 201 adjusts respective current values for achieving the primary transfer voltage or the secondary transfer voltage, and adjusts each target voltage of the charge voltage and the developing voltage as part of the image density adjustment. Thereafter, the CPU 201 performs the misregistration correction.

In step S-A3, even if an image formation request occurs during image adjustment operations, the CPU 201 continues the image adjustment operations. In step S-A4, when the image adjustment operations complete, the CPU 201 performs the stopping processing. The stopping processing includes stopping of output of various high voltages, processing for separation of the intermediate transfer belt 104 (switching from the full color mode to the monochrome mode), and stopping processing of the drum motors 109 and 111. In step S-A5, when the separation processing completes, the CPU 201 performs stopping processing for the drum motors 109 and 111.

In step S-A6, when the drum motors 109 and 111 stop, the CPU 201 starts the second preparation operation. Firstly, the CPU 201 activates the drum motors 109 and 111, and causes the rotation speed of each to increase to the target speed. In step S-A7, the rotation speed of each of the drum motors 109 and 111 reaches the target speed. Here, if the full color mode is designated in the image formation request, the CPU 201 performs contact processing. In other words, the CPU 201 drives the separation motor 112 to cause the intermediate transfer belt 104 to be in contact with the photosensitive drums 100a to 100c. If the monochrome mode is not designated, the CPU 201 skips the contact processing. In step S-A8, when the contact processing completes, the CPU 201 starts output of a high voltage required for image formation. In step S-A9, when each high voltage reaches a target voltage, the second preparation operation completes. Because of this the image forming unit 200 transitions to a state in which image forming is possible. As illustrated by FIG. 6A, a period from when the image formation request occurs until image formation is possible is Tm1.

Case of Shortening Control (Embodiment)

In FIG. 6B, step S-A1 through step S-A3 are as explained in relation to FIG. 6A. When an image formation request occurs in step S-A3, the CPU 201 stores information indicating that an image formation request has occurred in the RAM 203. For example, the CPU 201 sets (assigns 1 to) a flag for managing whether an image formation request has occurred.

In step S-B4, when the first preparation operation that includes image adjustment completes, the CPU 201 refers to the flag, and determines whether the flag is set. Upon recognizing that an image formation request has occurred during the first preparation operation based on the flag, the CPU 201 starts image formation while continuing output of various high voltages and continuing rotation of the drum motors 109 and 111. Note that high voltage target voltages are set to target voltages that correspond to the image formation request. In this way, when an image formation request occurs during the first preparation operation, the CPU 201 skips stopping processing or the second preparation operation. Because the first preparation operation includes all operations performed in the second preparation operation, the second preparation operation can be skipped. Because of this, a period from a timing when the image formation request occurred until a timing when image formation is possible is Tm2 (Tm2<Tm1). Accordingly, a waiting time until start of image formation is shortened. Note that, in the present embodiment, even if an image formation request for a monochrome image occurs during the first preparation operation, the CPU 201 causes the monochrome image to be formed to the image forming unit 200 while maintaining the full color mode. Because of this, a switching operation from the monochrome mode to the full color mode is omitted, and a waiting time until a start of image formation is further shortened.

<State Transition Diagram>

FIG. 7 is a state transition diagram that illustrates representative states that the image forming apparatus 10 can take. A powered off state ST0 is a state in which power is not being supplied from the external power supply (a state in which a main switch is off). When the main switch (a power switch) which is provided on the console unit 400 or the like is switched on, the image forming apparatus 10 activates, and transitions to a first preparation state ST1. The first preparation state ST1 is a state in which the image forming apparatus 10 performs the first preparation operation. When the first preparation operation completes, the CPU 201 performs stopping processing, and causes the image forming apparatus 10 to transition to a standby state ST2. When image formation is requested in the standby state ST2, the CPU 201 causes the image forming apparatus 10 to transition to a second preparation state ST3. The second preparation state ST3 is a state in which the image forming apparatus 10 performs the second preparation operation. When the second preparation operation completes, the CPU 201 causes the image forming apparatus 10 to transition to an image forming state ST4. In the image forming state ST4, the CPU 201 causes the image forming apparatus 10 to perform image formation in accordance with the image formation request. When image formation in the image forming state ST4 completes, the CPU 201 causes the image forming apparatus 10 to transition to the standby state ST2. Note that, when a further image formation request is inputted in the image forming state ST4, the CPU 201 causes the image forming apparatus 10 to stay in the image forming state ST4. When a power saving condition is satisfied in the standby state ST2, the CPU 201 causes the image forming apparatus 10 to transition to a power saving state ST5. A power saving condition is, for example, that an image formation request has not been inputted for a predetermined period in the standby state ST2. In the power saving state ST5, when a return condition is satisfied, the CPU 201 causes the image forming apparatus to transition to the first preparation state ST1. A return condition is, for example, that a button in the console unit 400 for instructing a return has been operated.

In particular, in the present embodiment, a route for transitioning from the first preparation state ST1 to the image forming state ST4 is provided. When image formation is requested in the first preparation state ST1, the CPU 201 causes the image forming apparatus 10 to directly transition to the image forming state ST4. In other words, the standby state ST2 and the second preparation state ST3 are skipped. Because of this, the waiting time is significantly shortened.

<CPU Functions>

Figure 8:
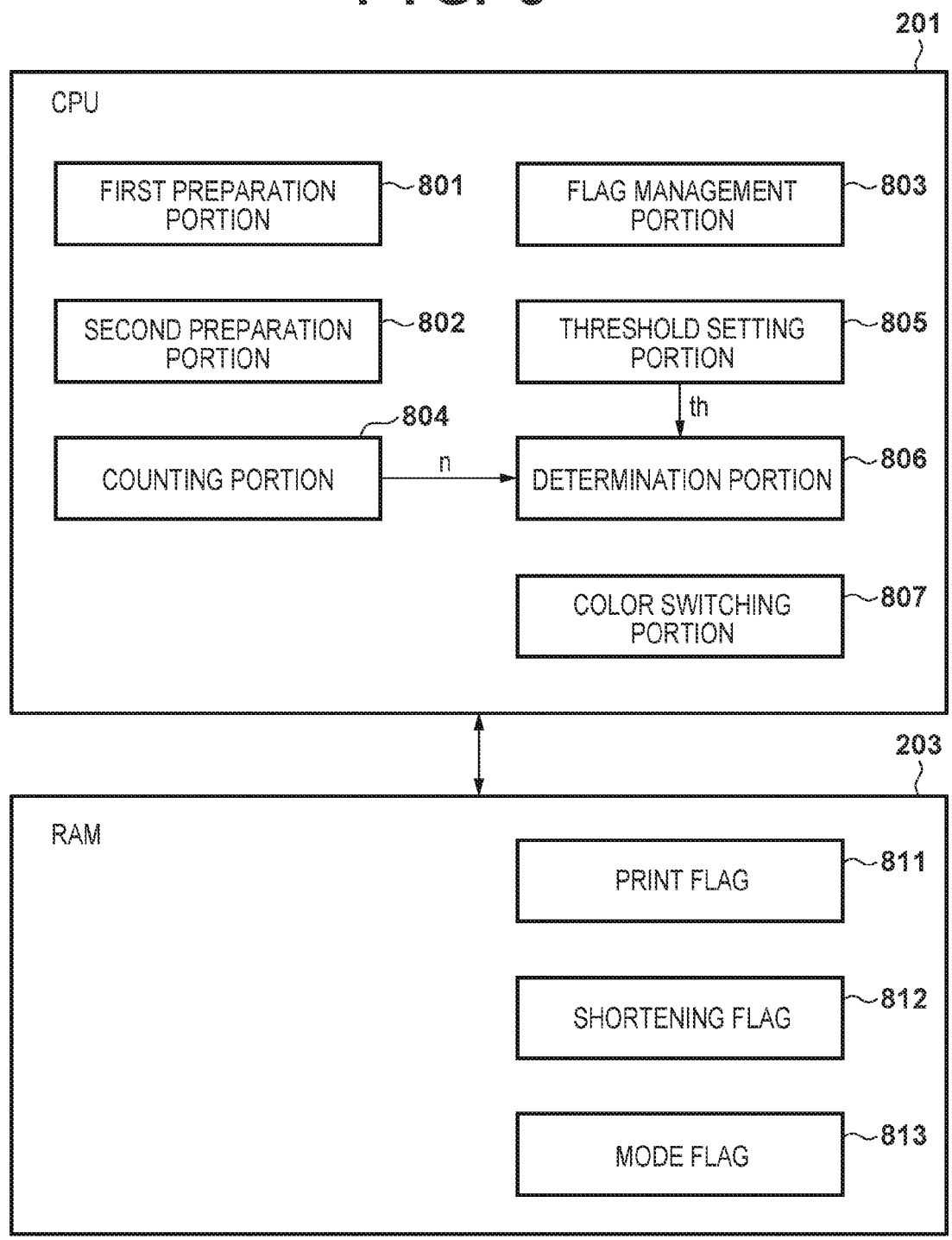
FIG. 8 is a figure illustrating functions of a CPU.

FIG. 8 illustrates functions that the CPU 201 realizes by executing a control program. Note that some or all of these functions may be realized by at least one piece of hardware such as an ASIC or an FPGA. ASIC is an abbreviation for application specific integrated circuit. FPGA is an abbreviation for field-programmable gate array. Configuration may be taken that the CPU 201 is configured by two or more kinds of CPU.

A first preparation portion 801 is a function for controlling the image forming apparatus 10 to perform the first preparation operation. A second preparation portion 802 is a function for controlling the image forming apparatus 10 to perform the second preparation operation. A flag management portion 803 manages a print flag 811 that indicates whether an image formation request has been inputted, a shortening flag 812 for indicating whether to perform shortening control, and a mode flag 813 for indicating a color mode. A counting portion 804 is a function for counting a number n of monochrome images formed in the full color mode. A threshold setting portion 805 is a function for setting a threshold th that is compared with the number n of monochrome images. A determination portion 806 is a function for determining whether a switching condition for switching from the full color mode to the monochrome mode is satisfied. A color switching portion 807 is a function for controlling switching of the color mode (switching a state of contact and a separated state).

<Flowcharts>

Figure 9:
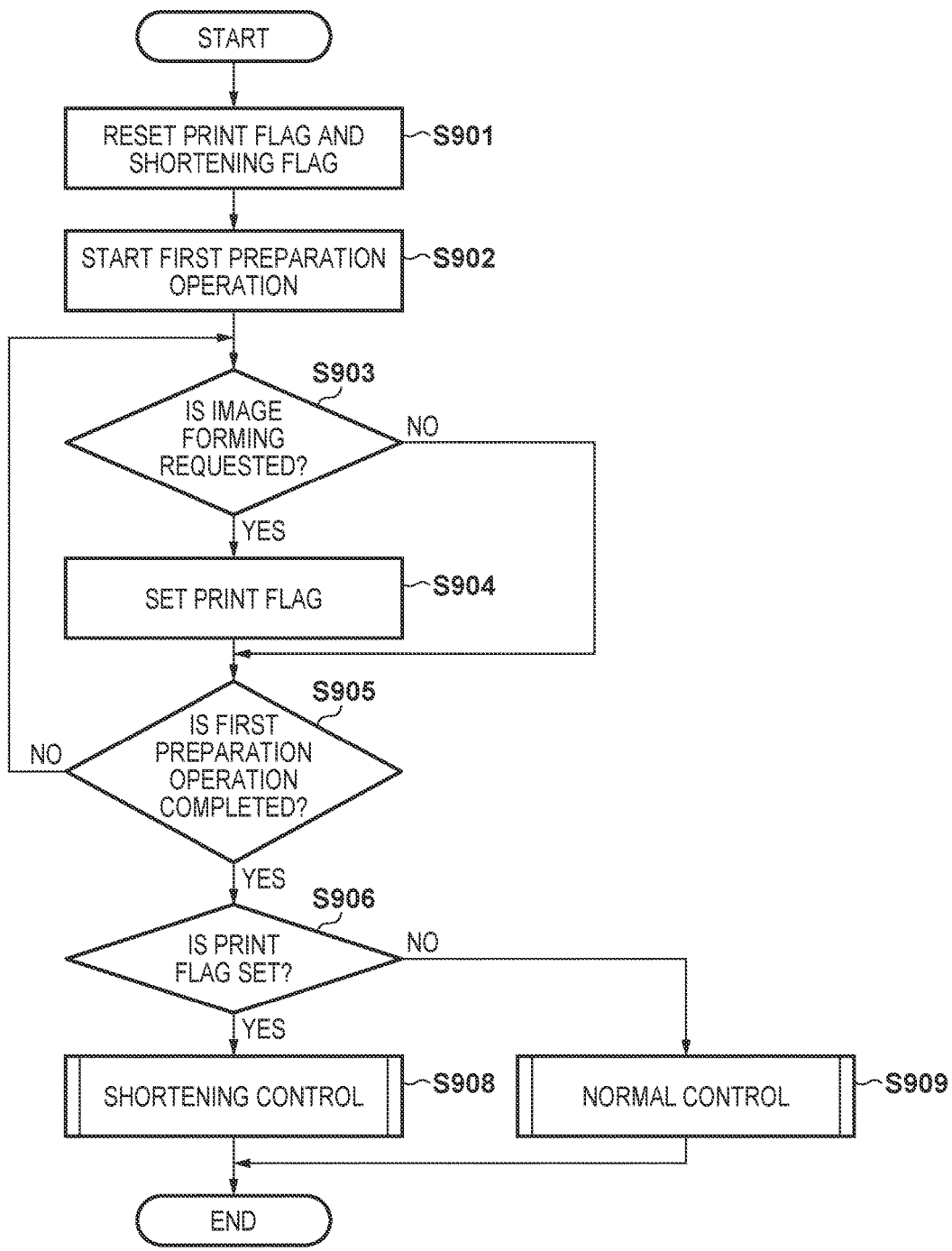
FIG. 9 is a flowchart for describing control relating to image formation.
Figure 10:
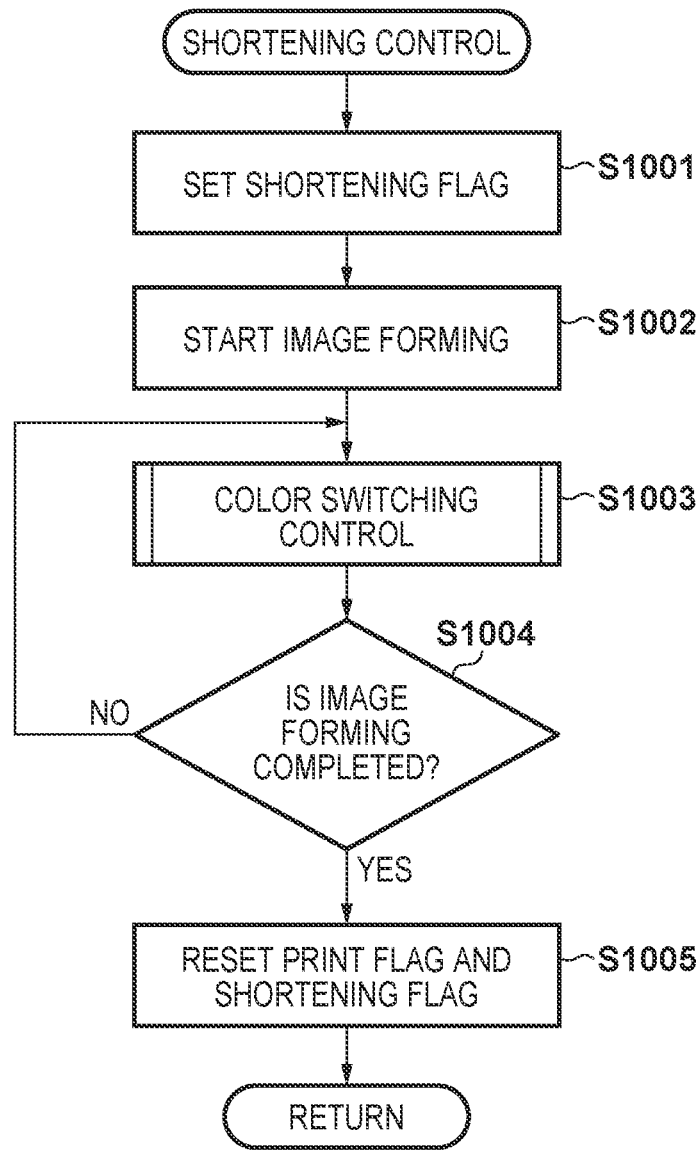
FIG. 10 is a flowchart for describing shortening control.
Figure 11:
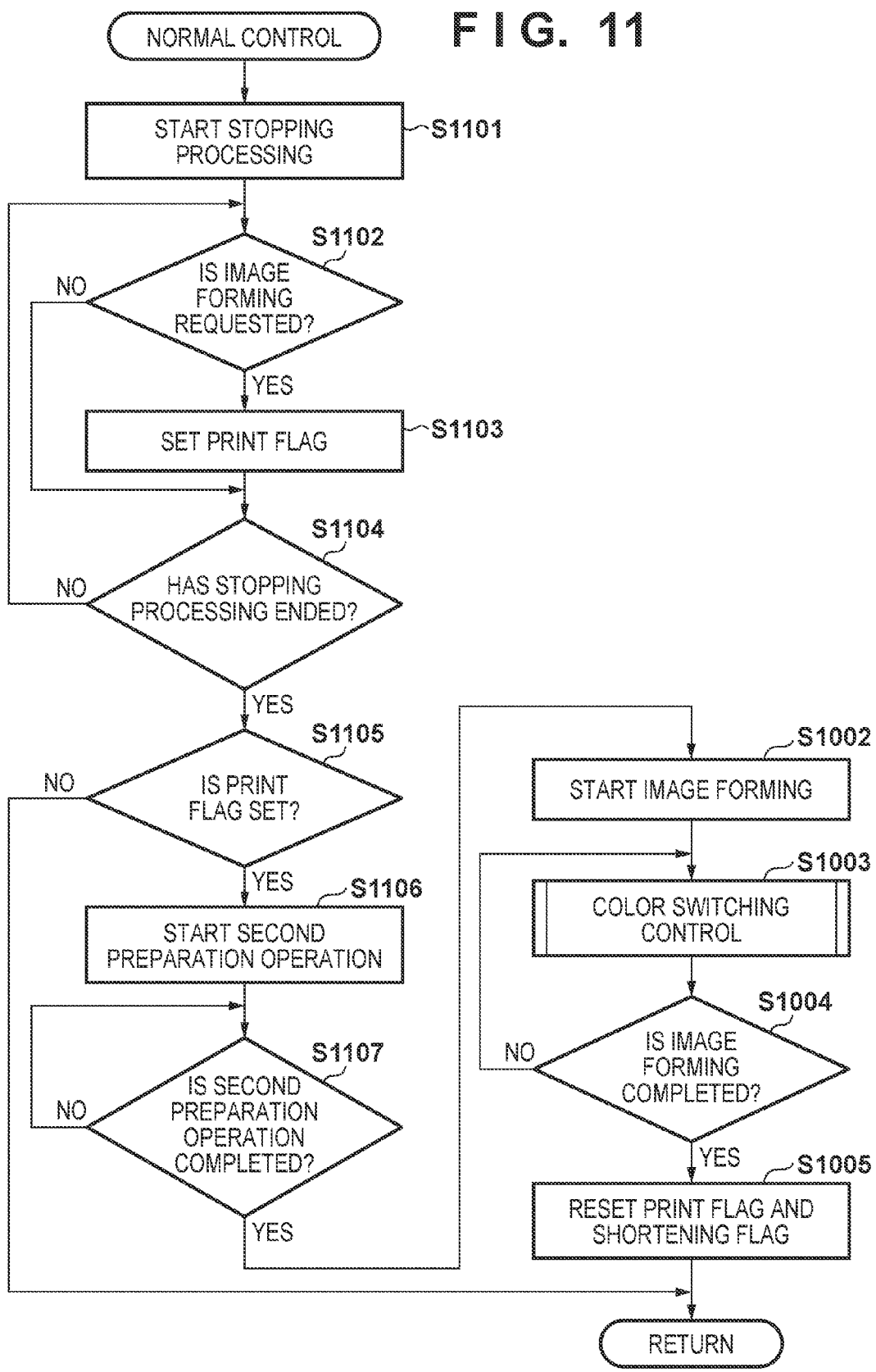
FIG. 11 is a flowchart for describing normal control.

FIG. 9 through FIG. 11 are used to explain processing performed by the CPU 201. Here, it is presumed that supply of power to the image forming apparatus 10 from an external power supply has started in accordance with power being turned on. Step S901 through step S906 correspond to the first preparation state ST1.

In step S901 the CPU 201 (the flag management portion 803) resets each of the print flag 811 and the shortening flag 812. In other words, the print flag 811 and the shortening flag 812 are one-bit variables, and are each set to 0. Because of this, the print flag 811 indicates that an image formation request has not occurred. The shortening flag 812 indicates that shortening control is disabled. In step S902, the CPU 201 (the first preparation portion 801) starts the first preparation operation. As described above, the first preparation portion 801 sets the color mode to the full color mode, and drives the separation motor 112 to cause the intermediate transfer belt 104 to be in contact with the photosensitive drums 100a to 100d. In addition, the first preparation portion 801 starts heating of the fixing device 107, causes the high voltage power supply 213 to start output of various high voltages, or the like. In addition, the first preparation portion 801 performs transfer voltage adjustment, misregistration correction, and image density adjustment. In step S903 the CPU 201 (the flag management portion 803) determines whether image formation has been requested. For example, it determines whether an image formation request has been inputted from the console unit 400 or the host computer 211. If image formation is not requested, the CPU 201 skips step S904 and advances the processing to step S905. In other words, the print flag 811 is maintained at 0. Meanwhile, if image formation is requested, the CPU 201 advances the processing to step S904. In step S904 the CPU 201 (the flag management portion 803) sets the print flag 811. In other words, the print flag 811 is set to 1. In step S905, the CPU 201 (the first preparation portion 801) determines whether the first preparation operation has completed. If the first preparation operation has not completed, the CPU 201 returns the processing to step S903. If the first preparation operation has completed, the CPU 201 advances the processing to step S906. In step S906 the CPU 201 (the flag management portion 803) determines whether the print flag 811 has been set. When the print flag 811 is 1, the CPU 201 recognizes that an instruction or a reservation has been made for shortening control, and advances the processing to step S908. In other words, the image forming apparatus 10 directly transitions from the first preparation state ST1 to the image forming state ST4. Meanwhile, if the print flag 811 is 0, the CPU 201 recognizes that an instruction (a reservation) has not been made for shortening control, and advances the processing to step S909. In other words, the image forming apparatus 10 transitions from the first preparation state ST1 to the standby state ST2.

Shortening Control

FIG. 10 illustrates shortening control according to step S908. Note that step S1001 through step S1005 correspond to the image forming state ST4. In step S1001 the CPU 201 (the flag management portion 803) sets the shortening flag 812. The shortening flag 812 is set to 1, indicating that a reservation for shortening control has been made. In step S1002 the CPU 201 causes the image forming apparatus 10 to start image formation in accordance with the image formation request. In step S1003 the CPU 201 (the color switching portion 807) performs color switching control. Description is given later for color switching control. In particular, the color switching portion 807 maintains the color mode in the full color mode, even if formation of a monochrome image is requested. In step S1004 the CPU 201 determines whether image formation according to the image formation request has completed. If image formation has not completed, the CPU 201 returns the processing to step S1003. Meanwhile, if image formation has completed, the CPU 201 advances the processing to step S1005. In step S1005 the CPU 201 (the flag management portion 803) resets each of the print flag 811 and the shortening flag 812. In this way, when an image formation request occurs in the first preparation operation, the image forming apparatus 10 transitions to the image forming state ST4 while continuing output of high voltages and rotation of rotating members. Therefore, the second preparation operation is unnecessary, and a waiting time is shortened. In addition, even if formation of a monochrome image is requested, because the full color mode set in the first preparation operation is maintained, a work time for transitioning from a state of contact to a separated state does not occur. Accordingly, the waiting time is further shortened.

Normal Control

FIG. 11 illustrates normal control according to step S909. The normal control is control in a case where an image formation request does not occur during the first preparation operation. Step S1101 through step S1105 correspond to the standby state ST2.

In step S1101, the CPU 201 starts the stopping processing. For example, the CPU 201 causes the high voltage power supply 213 to stop output of high voltages and causes the drum motor 109 and 111 or the like to stop. In addition, the CPU 201 drives the separation motor 112 to lower the primary transfer rollers 102a to 102c and separate the intermediate transfer belt 104 from the photosensitive drums 100a to 100c. In step S1102 the CPU 201 (the flag management portion 803) determines whether an image formation request has occurred. If an image formation request has not occurred during the stopping processing, the CPU 201 maintains the print flag 811 at 0, and advances the processing to step S1104. Meanwhile, if an image formation request occurs during the stopping processing, the CPU 201 advances the processing to step S1103. In step S1103 the CPU 201 (the flag management portion 803) sets the print flag 811. In step S1104 the CPU 201 determines whether the stopping processing has ended. If the stopping processing has not ended, the CPU 201 returns the processing to step S1102. If the stopping processing has ended, the CPU 201 advances the processing to step S1105. In step S1105 the CPU 201 (the flag management portion 803) determines whether the print flag 811 has been set. In other words, whether an image formation request has occurred during the stopping processing or after the stopping processing has ended is determined. If the print flag 811 is not set, the CPU 201 recognizes that an image formation request has not occurred, and stays in the standby state ST2. Meanwhile, if the print flag 811 is set, the CPU 201 recognizes that an image formation request has occurred during the stopping processing, and advances the processing to step S1106.

Step S1106 and step S1107 correspond to the second preparation state ST3. In step S1106, the CPU 201 (the second preparation portion 802) starts the second preparation operation. As described above, the second preparation operation includes start-up of the fixing device 107, output of high voltages, and the like. In step S1107 the CPU 201 (the second preparation portion 802) determines whether the second preparation operation has completed. When the second preparation operation completes, the CPU 201 advances the processing to step S1002 to transition to the image forming state ST4. In the image forming state ST4, the CPU 201 performs step S1002 through step S1005 as described above.

Color Switching Control

When too many monochrome images are formed in the full color mode, the life span of the photosensitive drums 100a to 100c will shrink. Accordingly, it is necessary to achieve both shortening of waiting time and reduction of wear of the photosensitive drums 100a to 100c. In addition, when a request to form a full color image in the monochrome mode is inputted, switching to the full color mode is necessary.

Figure 12:
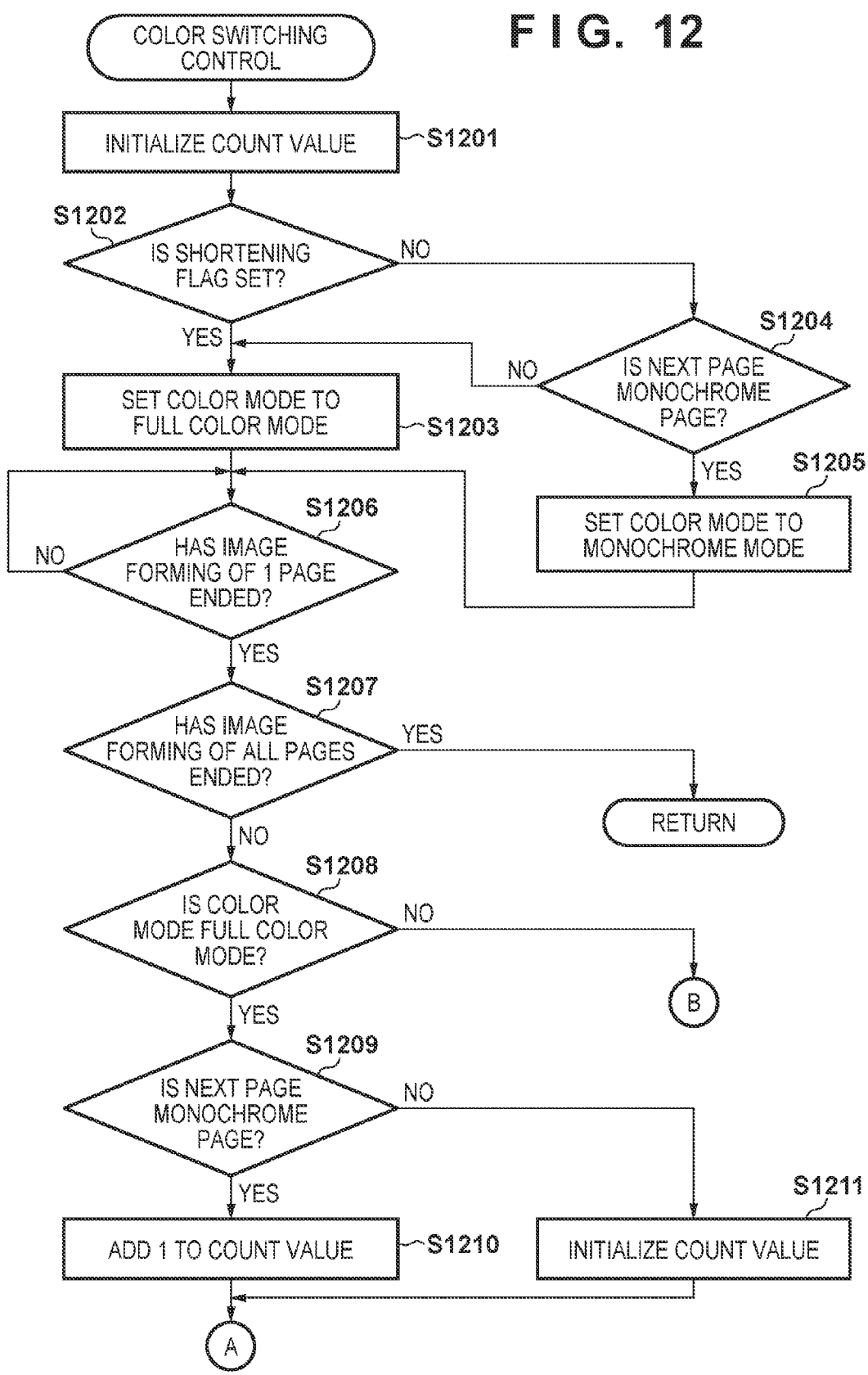
FIG. 12 is a flowchart for describing color switching control.

FIG. 12 and FIG. 13 illustrate color switching control corresponding to step S1003. In step S1201 the CPU 201 (the counting portion 804) initializes a count value for monochrome images to zero. A reason for counting the number of monochrome images is because wear of the photosensitive drums 100a to 100c is reduced by restricting a number of monochrome images formed while the full color mode is maintained. In step S1202 the CPU 201 (the flag management portion 803) determines whether the shortening flag 812 has been set. If the shortening flag 812 is set, the CPU 201 advances the processing to step S1203. In step S1203 the CPU 201 (the flag management portion 803) sets the mode flag 813 to thereby set the color mode to the full color mode. In addition, step S1204 is skipped. Because of this, when an image formation request occurs during the first preparation operation, the full color mode is maintained without performing color switching. Meanwhile, if the shortening flag 812 is not set, the CPU 201 advances the processing to step S1204. In step S1204 the CPU 201 analyzes the image formation request, and determines whether a next page is a monochrome page. A monochrome page is a sheet on which a monochrome image is to be formed. If the next page is a page on which a color image is to be formed, the CPU 201 advances the processing to step S1203. Meanwhile, if the next page is a monochrome page, the CPU 201 advances the processing to step S1205. In step S1205 the CPU 201 (the flag management portion 803) resets the mode flag 813 to thereby set the color mode to the monochrome mode. Because of this, wear of the photosensitive drums 100a to 100c is reduced.

In step S1206 the CPU 201 determines whether image formation of one page has ended. When image formation of one page ends, the CPU 201 advances the processing to step S1207. In step S1207 the CPU 201 determines whether image forming for all pages designated by the image formation request has ended. When image formation of all pages has not ended, the CPU 201 advances the processing to step S1208. Meanwhile, if image formation of all pages has ended, the CPU 201 returns to the previous processing. Here, the CPU 201 advances the processing to step S1004.

In step S1208 the CPU 201 refers to the mode flag 813, and determines whether the current color mode is the full color mode. If the current color mode is the full color mode, the CPU 201 advances the processing to step S1209. In step S1209 the CPU 201 determines whether the next page is a monochrome page. If the next page is a monochrome page, the CPU 201 advances the processing to step S1210. In step S1210 the CPU 201 (the counting portion 804) adds 1 to the count value. Meanwhile, if the next page is not a monochrome page, in other words if the next page is a full color page, the CPU 201 advances the processing to step S1211. In step S1211 the CPU 201 (the counting portion 804) initializes the count value to 0.

In step S1301 the CPU 201 (the threshold setting portion 805) determines whether the shortening flag 812 is set. If the shortening flag 812 is set, the CPU 201 advances the processing to step S1302. Note that a case in which the shortening flag 812 is set is a case in which an image formation request occurs during the first preparation operation. In step S1302 the CPU 201 (the threshold setting portion 805) sets a comparatively small first value (example: 3) to the threshold. Meanwhile, if the shortening flag 812 is not set, the CPU 201 advances the processing to step S1303. Note that a case in which the shortening flag 812 is not set is, for example, a case in which an image formation request occurs in the standby state ST2. In step S1303 the CPU 201 (the threshold setting portion 805) sets a second value (example: 5) larger than the first value to the threshold.

In step S1304 the CPU 201 (the determination portion 806) determines whether the count value exceeds the threshold. When the count value does not exceed the threshold, it is determined that a number of monochrome images consecutively formed in the full color mode is less than or equal to the threshold, and the CPU 201 advances the processing to step S1206. Meanwhile, if the count value exceeds the threshold, so as to protect the photosensitive drums 100a to 100c, the CPU 201 advances the processing to step S1305. In step S1305, the CPU 201 (the color switching portion 807) performs color switching from the full color mode to the monochrome mode. The flag management portion 803 resets the mode flag 813. In step S1306 the CPU 201 (the flag management portion 803) resets the shortening flag 812 along with initializing the count value, and advances the processing to step S1206. Because of this, excessive wear-and-tear on the photosensitive drums 100a to 100c is suppressed.

Meanwhile, upon determining in step S1208 that the color mode is the monochrome mode and not the full color mode, the CPU 201 advances the processing to step S1307. In step S1307 the CPU 201 (the color switching portion 807) determines whether the next page is a monochrome page. If the next page is a monochrome page, because there is no need to switch the color mode to the full color mode, the CPU 201 advances the processing to step S1206. Meanwhile, if the next page is a full color page and not a monochrome page, the CPU 201 advances the processing to step S1308 because there is a need to switch the color mode to the full color mode. In step S1308 the CPU 201 (the color switching portion 807) sets the mode flag 813, and drives the separation motor 112 to cause the intermediate transfer belt 104 to be in contact with the photosensitive drums 100a through 100c. In addition, the color switching portion 807 causes the high voltage power supply 213 to start output of the high voltages for yellow, magenta, and cyan. In addition, the color switching portion 807 also activates the drum motor 111 to cause the photosensitive drums 100a through 100c to rotate.

<Summary>

As explained using FIG. 1 and the like, the image forming apparatus 10 is an image forming apparatus that has a full color mode for forming a full color image, and a monochrome mode for forming a monochrome image. A station responsible for black is an example of a first forming unit for forming a monochrome image in the monochrome mode. Stations responsible for yellow, cyan, or magenta are examples of a second forming unit for forming a full color image in cooperation with the first forming unit in the full color mode. The intermediate transfer belt 104 is an example of an intermediate transfer unit that contacts with the photosensitive drum 100d and carries a monochrome image in the monochrome mode, and contacts with both of the photosensitive drum 100d and the photosensitive drums 100a to 100c and carries a color image in the full color mode. The secondary transfer roller 106 is a transfer unit that transfers an image being carried by the intermediate transfer belt 104 to a sheet. The fixing device 107 is a fixing unit that fixes an image to a sheet. The CPU 201 of the controller 212 is a control unit (processor) that controls the image forming apparatus 10. The first preparation portion 801 is an example of a first preparing function that the CPU 201 performs the first preparation operation in the full color mode when the image forming apparatus 10 activates by being supplied with power from a power supply. The second preparation portion 802 is an example of a second preparation function that the CPU 201 performs the second preparation operation in a color mode in accordance with the image formation request when an image formation request in accordance with a color mode of either of the monochrome mode or the full color mode is inputted while the state of the image forming apparatus 10 is the standby state ST2. The CPU 201, when an image formation request in accordance with the monochrome mode is inputted during performance of the first preparation operation, causes formation of a monochrome image in accordance with the full color mode while causing the first forming unit and the second forming unit to keep operating. In this way, when an image formation request occurs during performance of the first preparation operation, a waiting time is shortened because a standby state and the second preparation operation are skipped when the first preparation operation completes. In addition, if forming a monochrome image while the full color mode is maintained, the waiting time may be further shortened because a color switch from the full color mode to the monochrome mode does not occur.

The counting portion 804 functions as a counting function that the CPU 201 counts a number of monochrome images consecutively formed in the full color mode. The determination portion 806 functions as a determination function that the CPU 201 determines whether the number of monochrome images counted by the counting portion 804 exceeds a threshold. The color switching portion 807 that the CPU 201 switches the color mode from the full color mode to the monochrome mode and causes formation of a monochrome image in accordance with the monochrome mode when the counted number of monochrome images exceeds the threshold. Because of this, wear of the photosensitive drums 100a to 100c is suppressed.

As explained by using FIG. 7 or the like, if an image formation request is not inputted during performance of the first preparation operation, the CPU 201 causes the image forming apparatus to transition to the standby state ST2 when the first preparation operation completes. Conversely, if an image formation request is inputted during performance of the first preparation operation, the CPU 201 does not cause the image forming apparatus to transition to the standby state ST2 when the first preparation operation completes. In other words, because the image forming apparatus 10 transitions from the first preparation state ST1 to the image forming state ST4 without going through the standby state ST2, waiting time is shortened.

The first preparation operation includes output of a high voltage used by the black station, output of high voltages used by yellow and other stations, and output of a high voltage used by the secondary transfer roller 106. Furthermore, the first preparation operation includes adjustment of a position and density of an image formed by the black station, and adjustment of positions and densities of images formed by the yellow and other stations. When the image forming apparatus 10 is stopped throughout a long period, color misregistration or fluctuation of image densities may occur. Accordingly, by the first preparation operation, color misregistration is reduced, and the image densities are adjusted to ideal densities.

If a color mode designated by an image formation request is the full color mode, the second preparation operation includes output of a high voltage used by the black station, output of a high voltage used by the yellow and other stations, and output of a high voltage used by the secondary transfer roller 106. If the color mode designated by an image formation request is the monochrome mode, the second preparation operation includes output of a high voltage used by the black station, and output of a high voltage used by the secondary transfer roller 106. In other words, the second preparation operation is an operation in accordance with the image formation request.

As illustrated in FIG. 2B, in the monochrome mode the CPU 201 separates the intermediate transfer belt 104 from the photosensitive drums 100a to 100c while keeping the intermediate transfer belt 104 in contact with the image carrier of the photosensitive drum 100d. As illustrated in FIG. 2A, in the full color mode the CPU 201 causes the intermediate transfer belt 104 to be in contact with both of the photosensitive drum 100d and the photosensitive drums 100a to 100c. Here contact and separation are realized by the separation motor 112 which is a contact and separation unit. Because contact processing and separation processing involve mechanical operations, comparatively long waiting times occur. Accordingly, when a request for formation of a monochrome image is inputted during performance of the first preparation operation, the waiting time is significantly shortened by forming a monochrome image while the intermediate transfer belt 104 is kept in contact with the photosensitive drums 100a to 100c.

The separation motor 112, in the standby state ST2, separates the intermediate transfer belt 104 from the photosensitive drums 100a to 100c while the intermediate transfer belt 104 is kept in contact with the photosensitive drum 100d for black. It can be said that typically the frequency of formation of a monochrome image is higher than the frequency of formation for a full color image. Accordingly, by causing the image forming apparatus 10 to standby in the monochrome mode, a waiting time for when a request for formation of a monochrome image is inputted is reduced.

As illustrated in FIG. 4A and FIG. 4B, the first preparation operation and the second preparation operation may each include an increasing operation for increasing the fixing temperature of the fixing device 107 to the target temperature. A fixing film of the fixing device 107 must be increased from an environmental temperature to a fixing temperature, causing a certain amount of waiting time to occur. Accordingly, by increasing the temperature of the fixing device 107 in the first preparation operation and the second preparation operation, the waiting time may be shortened.

As illustrated in FIG. 2A and the like, the drum motor 109 is a first driving unit for driving the photosensitive drum 100d. The drum motor 111 is a second driving unit for driving the photosensitive drums 100a to 100c. When an image formation request in accordance with the monochrome mode is inputted during performance of the first preparation operation, the CPU 201 causes the black station to form a monochrome image in accordance with the image formation request while keeping the drum motors 109 and 111 operating. In this case the CPU 201 does not cause the yellow and other stations to form an image. For example, the CPU 201 controls the high voltage power supply 213 to stop output of high voltages used by the yellow and other stations. When developing voltages are outputted by the yellow and other stations, fogging toner may attach to the photosensitive drums 100a to 100c and the fogging toner may be transferred to the sheet. Accordingly, high voltages such as developing voltages or primary transfer voltages are not applied to the yellow and other stations. In addition, rotation of the developing sleeves of the developers 103a to 103c is stopped.

The flag management portion 803 is a flag management function that the CPU 201 sets a first flag (the print flag 811) when an image formation request is inputted in the first preparation state ST1. When the first preparation operation completes, the CPU 201 determines whether the print flag 811 is set. The CPU 201 causes the image forming apparatus 10 to transition to the image forming state ST4 if the print flag 811 is set, and causes the image forming apparatus 10 to transition to the standby state ST2 if the print flag 811 is not set. In addition, the flag management portion 803 may set a second flag (the shortening flag 812), if the print flag 811 is set when the first preparation operation has completed. The CPU 201 sets a first threshold (example: 3) as a threshold if the print flag 811 is set. If the print flag 811 is not set, the CPU 201 may set a second threshold (example: 5) that is larger than the first threshold as the threshold. Because of this, the state of contact is continuously maintained from the first preparation state ST1 to the image forming state ST4 in shortening control, and the photosensitive drums 100a to 100c are subject to wear. In contrast, in the normal control, the monochrome mode is maintained until the full color mode is designated in the image forming state ST4. In other words, in the normal control a period in which the state of contact is maintained is relatively short, and a degree to which the photosensitive drums 100a to 100c are subject to wear is smaller. Accordingly, the waiting time is shortened by delaying switching of the color mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-116457, filed Jun. 10, 2016, which is hereby incorporated by reference herein in its entirety.

What is claimed is:

1. An image forming apparatus having a full color mode for forming a full color image and a monochrome mode for forming a monochrome image as color modes, the apparatus comprising:
    an image forming unit including a first forming unit configured to form a monochrome image in the monochrome mode and a second forming unit configured to cooperate with the first forming unit to form a full color image in the full color mode;
    an intermediate transfer unit configured to contact with the first forming unit without contacting with the second forming unit and carry the monochrome image in the monochrome mode, and contact with both of the first forming unit and the second forming unit and carry the full color image in the full color mode;
    a transfer unit configured to transfer an image carried by the intermediate transfer unit to a sheet;
    a fixing unit configured to fix the image to the sheet; and
    a processor configured to control the image forming apparatus,
    wherein the processor includes:
    a first preparing function configured to perform a first preparation operation in the full color mode when power is supplied from a power supply to activate the image forming apparatus, and
    a second preparation function configured to perform, when an image formation request in accordance with one of the monochrome mode and the full color mode is inputted, a second preparation operation in the color mode in accordance with the image formation request, and
    wherein the processor is configured to, in a case where an image formation request in accordance with the monochrome mode is inputted during performance of the first preparation operation, cause the image forming unit to form a monochrome image in accordance with the full color mode without performing the second preparation operation for the monochrome mode after the first preparation operation is completed.

2. The image forming apparatus according to claim 1, wherein
the processor is configured to, when an image formation request in accordance with the monochrome mode is inputted during performance of the first preparation operation, cause the image forming unit to form the monochrome image in accordance with the full color mode while causing the first forming unit and the second forming unit to keep operating.

3. The image forming apparatus according to claim 2, wherein the processor further includes:
a counting function configured to count a number of monochrome images consecutively formed in the full color mode, and
a determination function configured to determine whether a number of monochrome images counted by the counting function exceeds a threshold,
wherein the processor is configured to, when the number of monochrome images counted by the counting function exceeds the threshold, cause the image forming unit to form the monochrome image in accordance with the monochrome mode after switching the color mode of the image forming apparatus from the full color mode to the monochrome mode.

4. The image forming apparatus according to claim 1, wherein
the processor is configured to, in a case where an image formation request is not inputted during performance of the first preparation operation, cause the image forming apparatus to transition to a standby state in which operation of the first forming unit and the second forming unit is caused to stop when the first preparation operation is completed.

5. The image forming apparatus according to claim 1, wherein
the first preparation operation includes output of a high voltage used by the first forming unit, output of a high voltage used by the second forming unit, output of a high voltage used by the transfer unit, adjustment of a position and a density of an image formed by the first forming unit, and adjustment of a position and a density of an image formed by the second forming unit.

6. The image forming apparatus according to claim 1, wherein
if the color mode designated by the image formation request is the full color mode, output of a high voltage used by the first forming unit, output of a high voltage used by the second forming unit, and output of a high voltage used by the transfer unit are included in the second preparation operation, and
if the color mode designated by the image formation request is the monochrome mode, output of a high voltage used by the first forming unit and output of a high voltage used by the transfer unit are included in the second preparation operation.

7. The image forming apparatus according to claim 1, further comprising:
a contact and separation unit configured to cause the intermediate transfer unit to separate from an image carrier of the second forming unit and contact with the image carrier of the second forming unit,
wherein the second preparation operation includes an operation for causing the intermediate transfer unit to be in a first state by the contact and separation unit in the monochrome mode, and an operation for causing the intermediate transfer unit to be in a second state by the contact and separation unit in the full color mode,
the first state being a state in which the intermediate transfer unit is separated from the image carrier of the second forming unit, and the second state being a state in which the intermediate transfer unit is contacted with the image carrier of the second forming unit, and
wherein the processor, in a case where the image formation request in accordance with the monochrome mode is inputted during performance of the first preparation operation, causes the image forming unit to form the monochrome image without switching the intermediate transfer unit from the second state to the first state by the contact and separation unit.

8. The image forming apparatus according to claim 7, wherein
the processor, if an image formation request is not made during performance of the first preparation operation, controls the contact and separation unit to switch the intermediate transfer unit from the second state to the first state.

9. The image forming apparatus according to claim 1, wherein
the first preparation operation and the second preparation operation each include a temperature adjusting operation in which a temperature of the fixing unit is adjusted to a target temperature.

10. The image forming apparatus according to claim 1, further comprising
a first driver configured to drive an image carrier of the first forming unit, and
a second driver configured to drive an image carrier of the second forming unit, and
wherein the processor is configured to, when an image formation request in accordance with the monochrome mode is inputted during performance of the first preparation operation, cause the first forming unit to form a monochrome image in accordance with the image formation request while keeping the first driver and the second driver operating, and not cause the second forming unit to form an image.

11. The image forming apparatus according to claim 3, wherein
the image forming apparatus has a first preparation state for performing the first preparation operation, a standby state in which operation of the first forming unit and the second forming unit is stopped, a second preparation state for performing the second preparation operation, an image forming state in which image formation is performed, and a power saving state, and
the processor is configured to:
cause the image forming apparatus to transition to the standby state if the image formation request is not inputted in the first preparation state,
cause the image forming apparatus to transition to the second preparation state when the image formation request is inputted in the standby state,
cause the image forming apparatus to transition to the image forming state when the second preparation operation is completed,
cause the image forming apparatus to transition to the image forming state when the image formation request is inputted in the first preparation state,
cause the image forming apparatus to transition to the standby state when image formation is completed,
cause the image forming apparatus to transition to the power saving state when a power saving condition is satisfied in the standby state, and cause the image forming apparatus to transition to the first preparation state when the power saving state ends.

12. The image forming apparatus according to claim 11, wherein the processor further includes a flag management function configured to set a first flag when the image formation request is inputted in the first preparation state, and
wherein the processor is configured to, when the first preparation operation is completed in the first preparation state, determine whether the first flag is set, cause the image forming apparatus to transition to the image forming state if the first flag is set, and cause the image forming apparatus to transition to the standby state if the first flag is not set.

13. The image forming apparatus according to claim 12, wherein
the flag management function is configured to set a second flag if the first flag is set when the first preparation operation is completed, and
the processor is configured to set a first threshold as the threshold if the second flag is set, and set a second threshold that is greater than the first threshold as the threshold if the second flag is not set.

14. A method implemented in an image forming apparatus having a full color mode for forming a full color image and a monochrome mode for forming a monochrome image as color modes, the image forming apparatus comprising an image forming unit including a first forming unit for forming a monochrome image in the monochrome mode and a second forming unit that cooperates with the first forming unit to form a full color image in the full color mode, an intermediate transfer unit that contacts with the first forming unit and does not contact with the second forming unit to carry the monochrome image in the monochrome mode and contacts with both of the first forming unit and the second forming unit to carry the full color image in the full color mode, a transfer unit for transferring an image carried by the intermediate transfer unit to a sheet, and a fixing unit for fixing the image to the sheet, the method comprising:
performing a first preparation operation in the full color mode when power is supplied from a power supply to activate the image forming apparatus;
performing, when an image formation request in accordance with one of the monochrome mode and the full color mode is inputted, a second preparation operation in the color mode in accordance with the image formation request, and
causing, in a case where an image formation request in accordance with the monochrome mode is inputted during performance of the first preparation operation, the image forming unit to form a monochrome image in accordance with the full color mode without performing the second preparation operation for the monochrome mode after the first preparation operation is completed.

15. An image forming apparatus having a full color mode for forming a full color image and a monochrome mode for forming a monochrome image as color modes, the apparatus comprising:
an image forming unit including a first forming unit configured to form a monochrome image in the monochrome mode and a second forming unit configured to cooperate with the first forming unit to form a full color image in the full color mode;
an intermediate transfer unit configured to contact with the first forming unit without contacting with the second forming unit and carry the monochrome image in the monochrome mode, and contact with both of the first forming unit and the second forming unit and carry the full color image in the full color mode;
a contact and separation unit configured to cause the intermediate transfer unit to separate from an image carrier of the second forming unit and contact with the image carrier of the second forming unit;
a transfer unit configured to transfer an image carried by the intermediate transfer unit to a sheet;
a fixing unit configured to fix the image to the sheet; and
a processor configured to control the image forming apparatus,
wherein the processor includes:
a first preparing function configured to perform a first preparation operation in a case where power is supplied from a power supply to activate the image forming apparatus in a state where the intermediate transfer unit is caused by the contact and separation unit to contact with both of an image carrier of the first forming unit and the image carrier of the second forming unit, and
a second preparation function configured to perform, when an image formation request in accordance with one of the monochrome mode and the full color mode is inputted after the first preparation operation is completed, a second preparation operation in the color mode in accordance with the image formation request, the second preparation operation including an operation for causing the intermediate transfer unit to be in a first state by the contact and separation unit in the monochrome mode, and an operation for causing the intermediate transfer unit to be in a second state by the contact and separation unit in the full color mode, the first state being a state in which the intermediate transfer unit is separated from the image carrier of the second forming unit, and the second state being a state in which the intermediate transfer unit is contacted with the image carrier of the second forming unit, and
wherein the processor is configured to, in a case where an image formation request in accordance with the monochrome mode is inputted during performance of the first preparation operation, cause the image forming unit to form a monochrome image in accordance with the full color mode without causing the intermediate transfer unit to be in the first state by the contact and separation unit after the first preparation operation is completed.

16. The image forming apparatus according to claim 15, wherein
the processor is configured to, when an image formation request in accordance with the monochrome mode is inputted during performance of the first preparation operation, cause the image forming unit to form the monochrome image in accordance with the full color mode while causing the first forming unit and the second forming unit to keep operating.

17. The image forming apparatus according to claim 15, wherein the processor further includes:
a counting function configured to count a number of monochrome images consecutively formed in the full color mode, and
a determination function configured to determine whether a number of monochrome images counted by the counting function exceeds a threshold, and wherein the processor is configured to, when the number of monochrome images counted by the counting function exceeds the threshold, cause the image forming unit to form the monochrome image in accordance with the monochrome mode after switching the color mode of the image forming apparatus from the full color mode to the monochrome mode.

18. The image forming apparatus according to claim 15, wherein
the first preparation operation includes output of a high voltage used by the first forming unit, output of a high voltage used by the second forming unit, output of a high voltage used by the transfer unit, adjustment of a position and a density of an image formed by the first forming unit, and adjustment of a position and a density of an image formed by the second forming unit.

19. The image forming apparatus according to claim 15, wherein
in a case where the color mode designated by the image formation request input after the first preparation operation is completed is the full color mode, output of a high voltage used by the first forming unit, output of a high voltage used by the second forming unit, and output of a high voltage used by the transfer unit are included in the second preparation operation, and
in a case where the color mode designated by the image formation request input after the first preparation operation is completed is the monochrome mode, output of a high voltage used by the first forming unit and output of a high voltage used by the transfer unit are included in the second preparation operation.

20. The image forming apparatus according to claim 15, wherein
the first preparation operation and the second preparation operation each include a temperature adjusting operation in which a temperature of the fixing unit is adjusted to a target temperature.

21. The image forming apparatus according to claim 15, further comprising:
a first driver configured to drive the image carrier of the first forming unit, and
a second driver configured to drive the image carrier of the second forming unit, and
wherein the processor is configured to, when an image formation request in accordance with the monochrome mode is inputted during performance of the first preparation operation, cause the first forming unit to form a monochrome image in accordance with the image formation request while keeping the first driver and the second driver operating, and not cause the second forming unit to form an image.

* * * * *